Dec. 24, 1929.  A. O. AUSTIN  1,740,638
YIELDING JOINT FOR INSULATORS AND THE LIKE
Filed Aug. 11, 1924  2 Sheets-Sheet 1
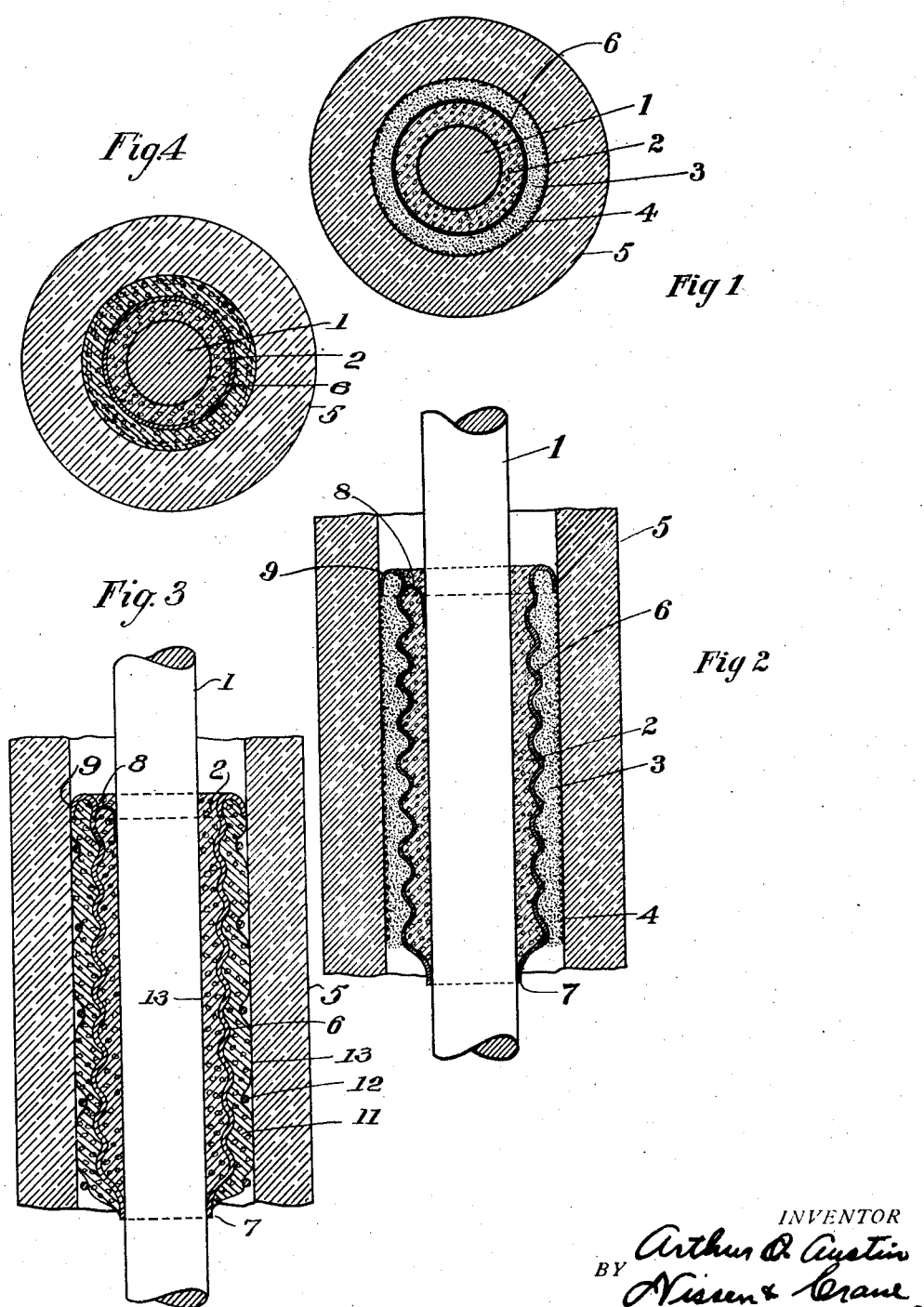

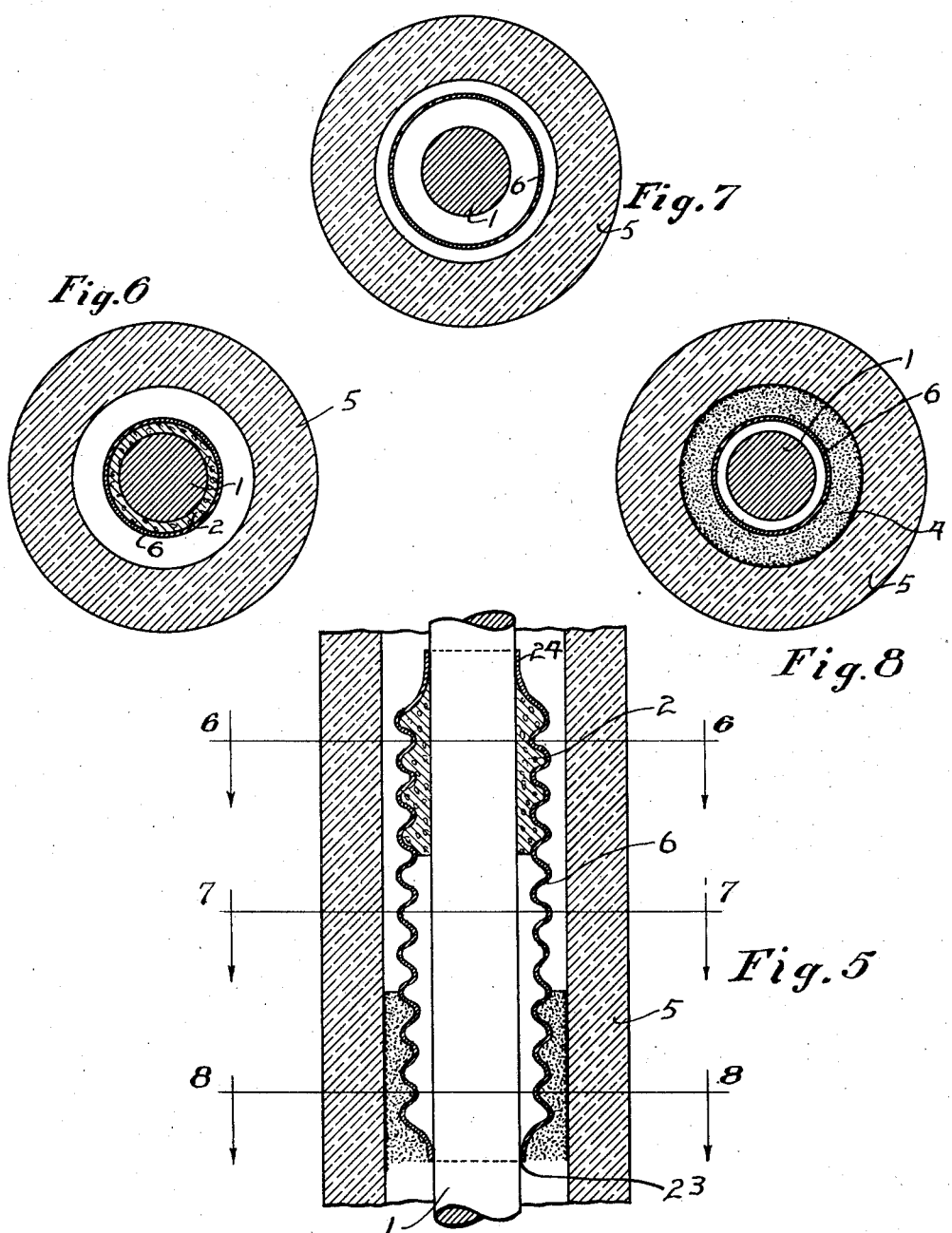

Patented Dec. 24, 1929

1,740,638

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

YIELDING JOINT FOR INSULATORS AND THE LIKE

Application filed August 11, 1924. Serial No. 731,500.

This invention relates to electrical apparatus and especially to joints between parts of insulator construction where slight relative movement is present. The object of the invention is to provide a joint between the various electrical members and more particularly between the metal and dielectric members which will provide relief from stresses and still maintain a mechanical joint. The invention is exemplified in the combination and arrangement of parts shown in the accompanying drawings and described in the following specification, and it is more particularly pointed out in the appended claims.

In the drawings—

Fig. 1 is a transverse sectional view of a portion of an insulator construction showing one embodiment of the present invention;

Fig. 2 is a longitudinal section of the joint shown in Fig. 1;

Figs. 3 and 4 are views similar to Figs. 2 and 1, respectively, showing another form of the present invention;

Fig. 5 is a longitudinal section of the joint showing a different modification of the invention;

Figs. 6, 7, and 8 are transverse sections on lines 6—6, 7—7, and 8—8, respectively, of Fig. 5.

In high voltage insulator members, particularly bushings, it is sometimes necessary to use rather large masses of metal in connection with the dielectric member which may be porcelain, glass or other suitable material. This dielectric member usually has a much smaller linear coefficient of expansion; hence, temperature changes will cause it to expand and contract less than the metal conducting parts or metal attachments.

Where the temperature rises considerable or the metal parts have considerable size or length, there may be a very appreciable movement of the metal parts compared to the dielectric parts. If provision is not made for this additional expansion or contraction, the dielectric parts may be damaged or the joints between the metal and the dielectric loosened.

The invention may be applied to various forms of high voltage insulators such as the joint between the conducting members and the dielectric in bushings, between the holding members and dielectric members in the case of pin insulators or between dielectric members such as between the baffle members in bushings or between the members in pin insulators. The application is best shown as applied to joining cylindrical members.

In the form of the invention shown in Figs. 1 and 2 the numeral 1 designates the conducting member, 2 the resilient material, 3 the cement and 4 the roughened surface of the dielectric 5. A tubular sheet metal member 6 is used to compress the resilient member 2 against the conducting rod 1. The conductor 1 is wrapped with a resilient member 2. This member is in the form of a cork tube or some material such as cotton or jute. The material should, however, preferably have some resiliency so as to maintain a tight joint without the application of too great a pressure. A tubular member 6 is then slipped over the cushioning or resilient member 2. The metallic member 6 is then spun or compressed so that it will hold the cushioning member tightly against the conductor rod 1 at all times. The member 6 is preferably made rough or ribbed during the compressing action so that the cushioning member will not slide in same and so as to form means for joining with the cement 3. Various materials can be used for the member 2, in some cases it being possible to use mineral wool, asbestos or other materials. Where the material is an insulator or has rather high resistance, the charging or combined charging or leakage current might burn the resilient member. Hence, it is advisable to protect the same from damage in this way. This applies particularly where the member 6 is of metal. This is accomplished by making electrical contact of member 6 with the conductor as at 7 or by member 8 if it is not feasible to connect the member 6 as at 7. Where the outer surface of the resilient member is conducting as in the case where this surface may be covered by a conducting coating, electrical connection may be made with the surface of the dielectric member through contact member 9. This tends to eliminate charging or leakage current in the cement member 3. If this member 9 is made in the form of a ring, it may assist in making up the joint as it will prevent the cement 3 from flowing through.

The object of the cement joints is to take up any irregularities in the dielectric members and to permit centering of the member 1. This cement joint may be made very small and, in fact, need not be cement at all as the joint may be made up of melted material such as sulphur, lead or other material which will harden and form a bond between the member 6 and the outer member 5. The joint as described provides a cushion for vibration as well as permits lateral expansion or contraction in the conducting member without setting up an excessive stress in the joint or the outer member, and, at the same time, may be used to maintain a tight joint. Where the member 1 and the member 5 are comparatively long and it is desired to hold them firmly at some other point, there may be a very appreciable longitudinal movement between the member 1 and the member 5. This is particularly true in bushings where the inner member is of copper which has a very high linear coefficient of expansion compared to that of the outer member 5 which may be of porcelain.

The joint as illustrated will permit movement between the member 1 and the cushioning or resilient member 2. In this case the joint acts as a stuffing box. The method described provides an easy and cheap method of making a joint which will take care of very severe conditions.

Figs. 3 and 4 show another modification of the joint. In this case the cement or holding material 3 is replaced by a yielding material 11 which is held to the member 6 by a spaced wrapping 12. In this form the cushion 2 is first applied to the member 1 and the clamping member 6 then compressed to hold member 2 against member 1. A tube or wrapping of cork or other resilient material 11 is then placed over the outside of member 6. In some cases a varnish is first applied either to the outside of member 2 or the inside of member 11 which will harden and cause the two members to adhere tightly. A binding ring or wrapping 12 is then applied to the outside. Spaces are allowed between successive bindings or turns 12. This allows the cushioning material 11 to come in contact with the outside member and form a mechanical joint. Where rings are used or the space is filled around the turns as in a wrapping, this will also form an air or fluid tight joint. This joint may be made up on the rod and simply shoved into place. Where the longitudinal movement is not very great or the separation between conductor 1 and the outer member 5 is sufficient, cushioning members may be joined to adjacent members by a varnish, glue or other suitable material at 13, which will prevent them slipping and maintain a tight joint. Where an adhesive material is used, a much lighter pressure may be used and still maintain a tight joint. The adhesive material may be used to advantage in assembling for lubricating the parts, permitting them to be shoved into place. Joints of this kind may be made up in several layers as well as in a single layer. In general a coating is used between member 5 and 11. In some cases, it is possible to eliminate the member 6 and 12, simply forcing a cushioning ring of material between the two surfaces. This material may be stuck to either or both members 1 and 5 by a suitable adhesive material. A ring of cork has been found to be especially suitable for this purpose.

Fig. 5 shows the adaptation of the joint where the yielding material tends to maintain a tight joint only, the longitudinal movement being taken care of in the compressing member 6. The conducting member 1 is free to slip although it may be held in position. If the longitudinal movement is rather small, the yield will be taken up in the elastic movement of the member 6 which is unsupported. Where this movement is not very great, the member 6 may be soldered or brazed to member 1 as at 24. In general, however, it is desirable to leave the member 6 in electrical contact only at this point with member 1, depending upon the cushioning material 2 to provide a tight joint. Also very large variation in movement can then be taken care of through slipping of member 1 as through the cushioning material 2. The slight variations, however, will be taken up by the unsupported section 6. This will tend to reduce wearing in the slipping surfaces and, at the same time, maintain a tight joint.

I claim:

1. The combination with a conductor of a cork sleeve surrounding said conductor, a sheet metal sleeve surrounding said cork sleeve to compress said cork sleeve against said conductor, said metal sleeve being bent to provide an uneven surface, a dielectric member surrounding said metal sleeve and connecting material that sets when permitted to stand, interposed between said metal sleeve and dielectric member for securing said sleeve to said dielectric member.

2. The combination with a conductor of a cork sleeve surrounding said conductor, a circumferentially corrugated metal sleeve surrounding said cork sleeve for compressing said cork sleeve against said conductor, said metal sleeve having electrical contact with said conductor, a tubular dielectric member surrounding said metal sleeve and spaced therefrom, and cement interposed between said dielectric member and metal sleeve, said metal sleeve having electrical connection with the interior of said dielectric member.

3. The combination with a tubular member and an inner member extending through said tubular member and spaced from the inner wall thereof, of a packing joint between said two members, said packing joint comprising a layer of yielding material, a sheet metal sleeve enclosing said layer of yielding material, and connecting material interposed between said sleeve and said tubular member and securing the outer surface of said sleeve to said tubular member, said sleeve being extended outwardly at one end to engage the inner face of said tubular member and inwardly at the other end to engage the outer face of said inner member, thus forming a baffle bridging the space between said outer and inner members.

4. The combination with a tubular dielectric member, of a conductor rod extended through said tubular member and spaced therefrom, and a packing joint interposed between said dielectric member and conductor rod, said packing joint comprising a layer of compressible packing material slidably engaging the outer surface of said conductor rod, a circumferentially corrugated sheet metal sleeve surrounding said packing material, and cement interposed between the outer surface of said sleeve and the inner surface of said dielectric member, said sleeve being bent inwardly at one end to engage the outer surface of said conductor rod and form electrical contact therewith while the opposite end of said sleeve is bent outwardly to engage the inner face of said dielectric member.

In testimony whereof I have signed my name to this specification on this 4th day of August, A. D. 1924.

ARTHUR O. AUSTIN.